(12) United States Patent
Levine et al.

(10) Patent No.: US 10,999,334 B2
(45) Date of Patent: May 4, 2021

(54) SYSTEM AND METHOD FOR MULTI-PARTY COMMUNICATION OF TRENDING TOPICS

(71) Applicant: Comet Capital, LLC, Sarasota, FL (US)

(72) Inventors: Lawrence T. Levine, Sarasota, FL (US); David Michael Weber, Somerset West (ZA)

(73) Assignee: COMET CAPITAL, LLC, Sarasota, FL (US)

( * ) Notice: Subject to any disclaimer, the term of this patent is extended or adjusted under 35 U.S.C. 154(b) by 205 days.

(21) Appl. No.: 15/627,120

(22) Filed: Jun. 19, 2017

(65) Prior Publication Data

US 2017/0353510 A1  Dec. 7, 2017

Related U.S. Application Data

(63) Continuation of application No. 15/489,244, filed on Apr. 17, 2017, which is a continuation-in-part of
(Continued)

(51) Int. Cl.
*H04L 12/18* (2006.01)
*H04L 29/06* (2006.01)
(Continued)

(52) U.S. Cl.
CPC ........ *H04L 65/403* (2013.01); *H04L 12/1813* (2013.01); *H04L 65/1086* (2013.01);
(Continued)

(58) Field of Classification Search
CPC ... H04L 65/403; H04L 67/18; H04L 65/4038; H04L 67/306; H04L 12/1813; H04M 2203/5072; H04M 3/18; H04M 3/568; H04M 3/564; H04W 4/021; H04W 76/45; H04W 4/21; H04W 4/02; H04W 76/00;
(Continued)

(56) References Cited

U.S. PATENT DOCUMENTS 8,326,338 B1 * 12/2012 Vasilevsky ........ H04M 3/42008
                                                    455/519
10,021,059 B1 * 7/2018 Rao ........................ H04L 51/08
(Continued)

*Primary Examiner* — Jeanette J Parker
(74) *Attorney, Agent, or Firm* — Bechen PLLC; Timothy J. Bechen

(57) ABSTRACT

A system and method for multi-party communication includes determining a trending common identifier within a media platform and generating a communication channel within a communication platform based on the common identifier. The method and system includes, in response to a join request from each of a plurality of users, connecting the plurality of users to the communication channel, where the communication channel is an open communication channel for active audio communication between the plurality of users across the communication platform and facilitating audio communication between the plurality of users, including providing a visual display on the communication platform, including visual display of the active audio communication across the communication platform.

12 Claims, 11 Drawing Sheets

Related U.S. Application Data application No. 13/837,478, filed on Mar. 15, 2013, now Pat. No. 9,774,639.

(60) Provisional application No. 62/351,634, filed on Jun. 17, 2016.

(51) Int. Cl.

| | | |
|---|---|---|
| *H04L 29/08* | (2006.01) | |
| *H04W 4/21* | (2018.01) | |
| *H04W 4/029* | (2018.01) | |
| *H04N 7/15* | (2006.01) | |
| *H04M 3/18* | (2006.01) | |
| *H04M 3/56* | (2006.01) | |
| *H04W 76/45* | (2018.01) | |
| *H04N 7/14* | (2006.01) | |
| *H04W 4/021* | (2018.01) | |

(52) U.S. Cl.
CPC ............ *H04L 67/306* (2013.01); *H04M 3/18* (2013.01); *H04M 3/568* (2013.01); *H04N 7/15* (2013.01); *H04N 7/152* (2013.01); *H04W 4/029* (2018.02); *H04W 4/21* (2018.02); *H04W 76/45* (2018.02); *H04L 65/4038* (2013.01); *H04L 67/18* (2013.01); *H04M 2203/5072* (2013.01); *H04N 2007/145* (2013.01); *H04W 4/021* (2013.01)

(58) Field of Classification Search
CPC .... H04N 2007/145; H04N 7/15; H04N 7/152; G06F 3/048
See application file for complete search history.

(56) References Cited

U.S. PATENT DOCUMENTS

| | | | | |
|---|---|---|---|---|
| 2007/0239885 | A1* | 10/2007 | Vadlakonda | ........ H04L 12/1827 709/232 |
| 2011/0196969 | A1* | 8/2011 | Tarte | ................ H04N 21/41422 709/227 |
| 2012/0200419 | A1* | 8/2012 | Nylund | ................... H04L 67/18 340/686.1 |
| 2014/0025734 | A1* | 1/2014 | Griffin | ................... G06Q 50/01 709/204 |
| 2014/0235215 | A1* | 8/2014 | Perez | ..................... H04M 3/56 455/416 |

* cited by examiner

SYSTEM AND METHOD FOR MULTI-PARTY COMMUNICATION OF TRENDING TOPICS

RELATED APPLICATIONS

The present application is a continuation of and claims priority to U.S. patent application Ser. No. 15/489,244 filed Apr. 17, 2017 entitled "SYSTEM AND METHOD FOR MULTI-PARTY COMMUNICATION," which is a continuation-in-part of and claims priority to U.S. patent application Ser. No. 13/837,478 filed Mar. 15, 2013 entitled "SYSTEM AND METHOD FOR MULTI-PARTY COMMUNICATION."

The present application claims priority to U.S. Patent Application Ser. No. 62/351,634 filed Jul. 17, 2016 entitled "SYSTEM AND METHOD FOR BIDIRECTIONAL COMMUNICATION OF TRENDING TOPICS."

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The disclosed technology relates generally to communication systems and more specifically to software and hardware based emulation for providing multi-party communications relating to trending topics.

BACKGROUND

Multi-party communication has long been an enjoyable form of various individuals to share information with each other. Early forms of this communication included citizen band (CB) radios, where users were able to transmit and receive messages over a defined distance. Users could openly talk with other users on various channels, where these channels were dictated by radio frequencies.

A common utilization of this type of multi-party communication was for road travelers, including semi drivers and hobbyists. For instance, truck drivers could share information about traffic issues within a particular distance. Other uses include hobbyists having random conversations with other users from their home radios.

Network-based computing has further enhanced the ability to multi-party communication, including users talking within online discussion boards or audio distribution networks. Where there are known audio distribution systems, such as distributing musical playlists, transmitting podcast, there are also known online communication platforms for video conference or voice-over-IP.

Present technology fails to account for integrating audio communication with trending or timely topics arising from social media platforms. Where trending topics arise, there is a current need for the ability to generate a platform allowing users to engage in discussions about those timely topics. There is a need for a communication platform working with or integrated into a social media platform allowing for the timely generation and/or management of a communication channel relating to a trending topic. There is a need for the communication platform to have management controls and engagement protocols for facilitating meaningful engagement thereacross.

BRIEF DESCRIPTION

A system and method for multi-party communication includes determining a trending common identifier within a media platform and generating a communication channel within a communication platform based on the common identifier. The method and system includes, in response to a join request from each of a plurality of users, connecting the plurality of users to the communication channel, where the communication channel is an open communication channel for active audio communication between the plurality of users across the communication platform and facilitating audio communication between the plurality of users, including providing a visual display on the communication platform, including visual display of the active audio communication across the communication platform.

The method and system further includes further communication techniques for modulating or regulating the communication platform. For example, the method and system includes user login or other identification, as well as user controls or preferences on the communication platform. The method and system includes the communication platform operating with either or both an open communication channel and/or a touch-to-talk channel.

Whereby, the method and system integrates a communication platform allowing for directed communication relating to trending topics as determined by associated media platforms. The media platforms may be a social media platform providing for user generated content, but may also be any suitable platform allowing for the distribution of content having one or more identifiers associated therewith. For example, an identifier may be a hashtag associated with a media content item.

In one embodiment, the present invention operates within or in addition to an existing platform. For example, one embodiment may be a social media platform whereby users are posting messages and including common identifiers. One example of a common identifier may be a hashtag. In the platform processing of these multiple messages, messages with common identifiers can then be grouped and those multiple messages visible in a single display. The present invention operates with this platform to allow all users having the common identifier to then be merged into the bi-directional communication channel.

The gateway to the bidirectional communication channel can operate within an existing media platform. In the media platform, where multiple common identifiers are used, the platform then creates a media channel solely based on this identifier. The channel can operate concurrent with the existing platform's display of content, such as users posting text, images, links, etc., along with the common identifier. When the media channel is established, this allows any number of parties to seamlessly join the bidirectional communication channel. As the channel is established based on the common identifier, it is recognized that the common interest of parties joining the channel relate to the common identifier and as such, the likely topic of conversation is the item described by the common identifier.

Therefore the present invention provides a system and method for generating a communication channel based on a common identifier. The present invention provides a system and method for filtering multiple users into a common communication platform based a common topic as determined by common identifiers used in media platform. The present invention enhances an existing media platform or any other platform by bringing together disparate users into a single communication platform based on a common topic, as determined by the users. Therefore, in this communication channel, users can communicate beyond the existing static input/output of the underlying media platform.

Additionally, the communication platform therein allows for the termination or dissolution of the channel when the underlying topic of conversation, as indicated by the common identifier, is no longer of presence importance. By way of example, if the common identifier is no longer a trending topic, the channel can then be terminated.

BRIEF DESCRIPTION OF THE DRAWINGS

A better understanding of the disclosed technology will be obtained from the following detailed description of the preferred embodiments taken in conjunction with the drawings and the attached claims.

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

Figure 1:
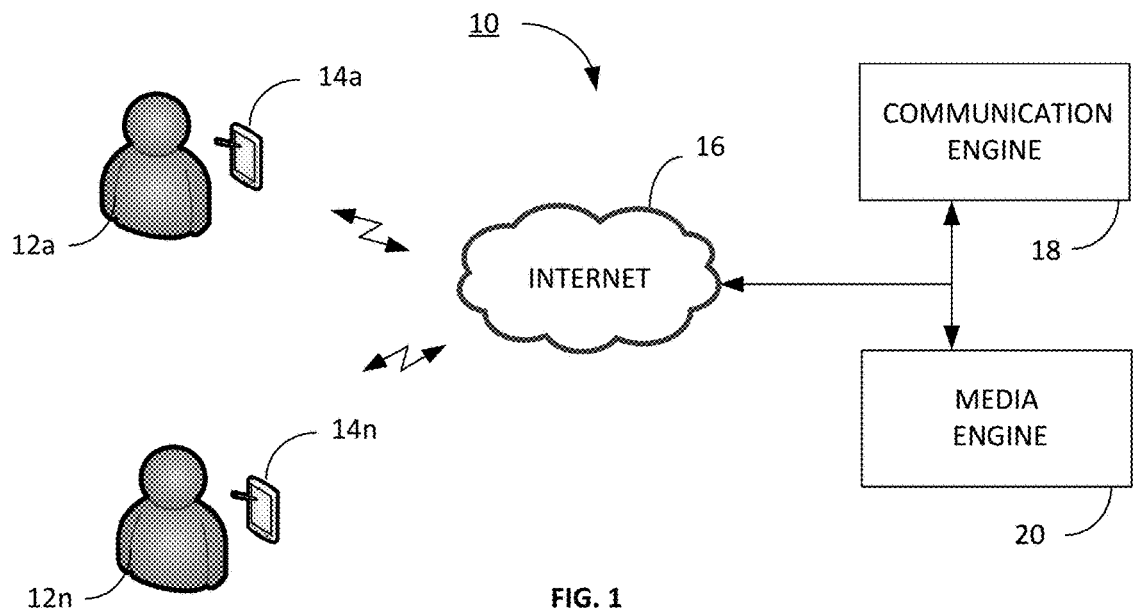
FIG. 1 illustrates a computing system providing for multi-party communication relating to trending topics.

FIG. 1 illustrates one embodiment of a communication system 10 providing for multi-party communication. The system 10 includes a plurality of users 12a-12n having computing devices 14a-14n (where "n" is any suitable integer), network 16 and network communication engine 18 with media engine 20.

The computing devices 14 may be any suitable device providing for network connectivity, including for example but not limited to mobile or desktop computer(s), smart phones, tablets, in-dash vehicle computing systems, video game systems, set-top box devices, etc. The network 16 may be any suitable network, including a local area network or a wide area network, such as the Internet. Communication across the network is conducted using known protocols.

The communication engine 18 may be one or more computing devices providing for communication between multiple users, consistent with the description herein. The media engine 20 may be one or more computing devices providing a platform for media content generation and distribution. By way of example, but not expressly limiting, the media platform may be a messaging platform, an imaging platform, a video distribution platform, articles or content distribution platform, etc. Operation of the content generation and distribution within the platform may be performed using known techniques, whereby the present method and system includes functionality for recognizing trending topics and facilitating one or more communication channels relating to said trending topics.

The communication engine 18 is illustrated separate from the media engine 20, but it is recognized that these engines 18, 20 may be disposed within the same computing system. Whereas, in a further embodiment, these systems computingly engage with each other while being disposed in separate platforms.

Figure 2:
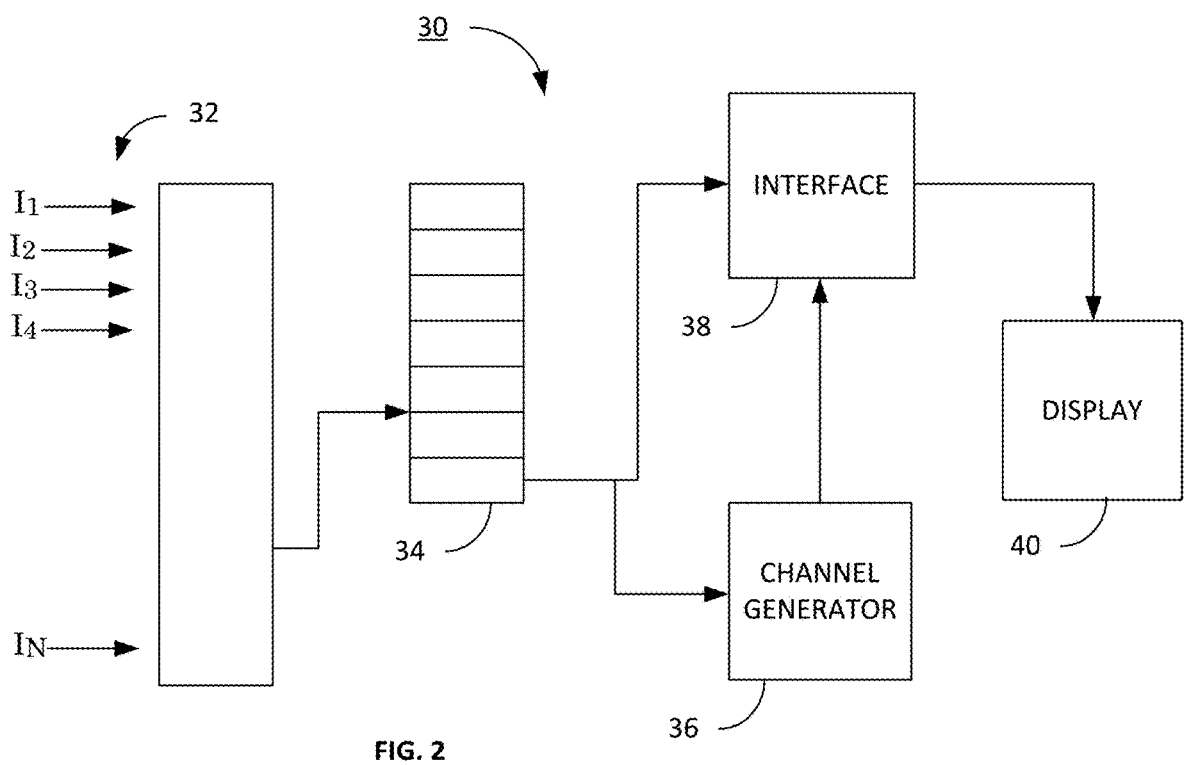
FIG. 2 illustrates a computing system providing for multi-party communication relating to trending topics.

FIG. 2 illustrates one exemplary embodiment of a media platform 30 with a channel generator. The media platform 30 receives multiple user inputs 32 ($I_1$-$I_N$), each input including content and may include a common identifier. The media platform operates to filter and process the inputs into a distributable format. Where a common identifier is used, the input may be separately stacked, consistent with known hashtag protocols for data processing.

In the present invention, a channel generator runs concurrent to the interface, using the common identifier stack 34 as a means for generating a channel with a channel generator 36. While the interface 38 generates the display made available to the user, the channel generator generates the communication channel using the common identifier inputs. The channel generator therein opens a channel based on the common identifier, such channel can be available to the users using the common identifier, as well as users following media platform, the channel made available via the display 40.

Figure 3:
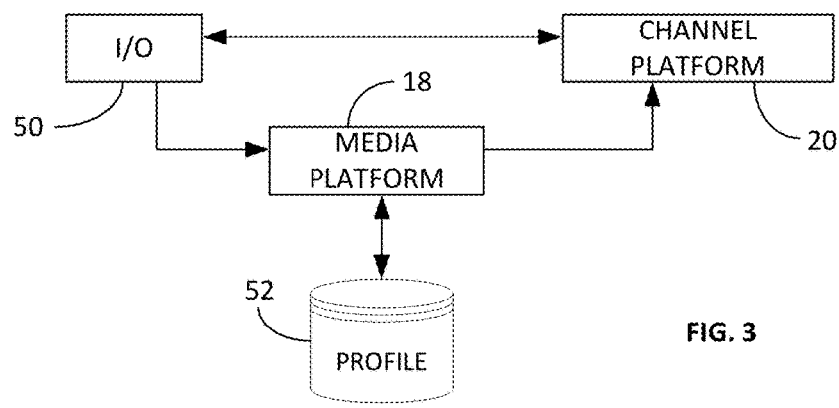
FIG. 3 illustrates a processing diagram showing multi-party communication relating to trending topics.

FIG. 3 illustrates one embodiment of the user interface 50. The user interacts via an input/output interface 50, such as, but not limited to, a mobile computing device or a desktop or laptop computer. The user, having access to the media engine 20, can seek to join a channel generated based on the common identifier. The user sends a join request to the media engine 20. For example, the join request may be a simple single click on a join icon visible on the media platform display. In one embodiment, the profile information for the user may be accessed and used and/or verified for the channel engine 20.

The media engine 18 can then send the engagement request to the channel engine 20. The channel engine 20 adds the new user on to the communication platform, including for example in one embodiment using a profile data from the media platform profile database 52, or in another example using a profile associated with the channel platform 20.

Using a more concrete example of a media platform, suppose the media platform is Twitter®. In this media platform, after the user is logged in, the display is filtered based on the user preferences, or who the user has decided to follow. Thus, while the media platform receives thousands of tweets in any moment, the platform itself filters those inputs and directs a limited subset of inputs to the user based on the user presence.

In the Twitter® platform, the user may additionally access further information via search function or active hyperlinks within the display. Another display feature may be the display of trending topics. As the trending of topics is based on commonly-used hashtags, the display of a selection of trending tweets using the hashtag provide the user with an immediate view of a sampling. These trending topics allow a variety of users to congregate around a common topic and thus with the inclusion of the communication channel, the users may then go beyond sharing static posts, tweets, status updates, etc. Instead, by the selection of an icon or otherwise interface means, the user can then be inserted into the communication channel for direct communication with other users centered around the common topic identified by the hashtag.

Figure 17:
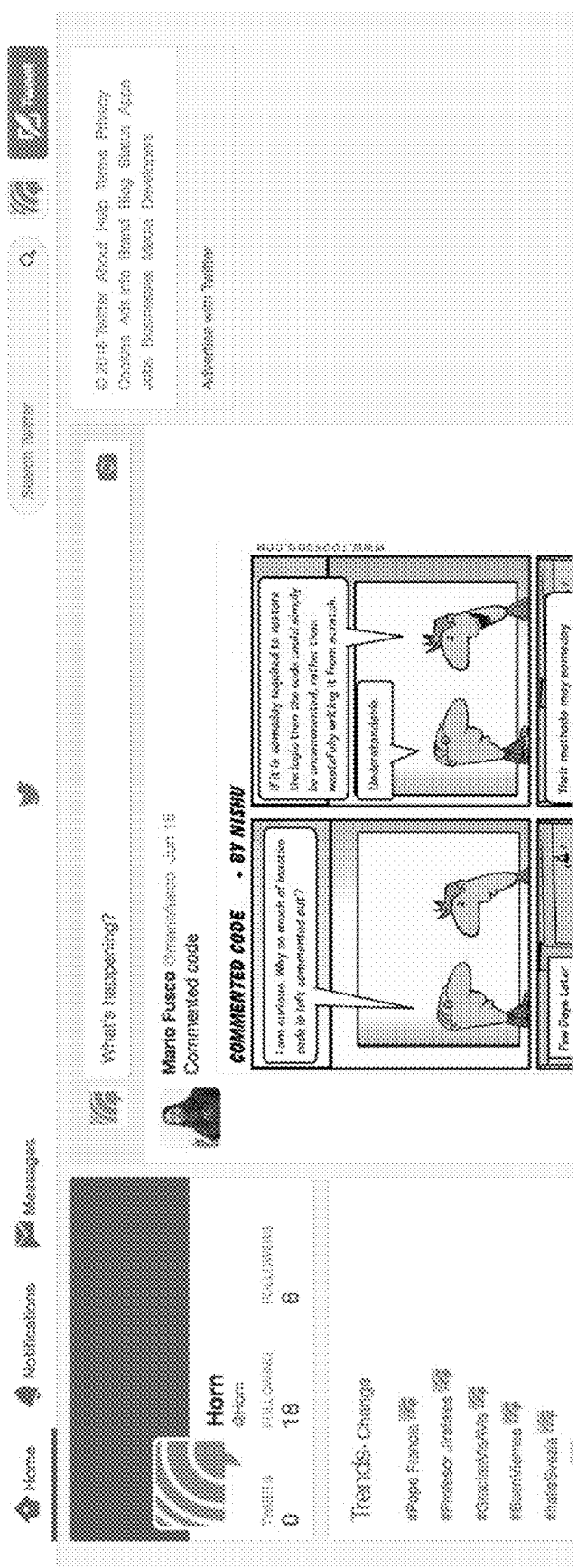
FIG. 17 illustrates a sample screenshot of a media platform using common identifiers.

In the above example of the Twitter® platform, FIG. 17 illustrates a sample screenshot of the user interface having the communication channel platform. In the screenshot of FIG. 17, the left hand side of the display includes a visual display of trending topics. Next to each topic is an active icon. In the prior system, selecting the icon would populate a display page of the trending tweets, but having the inclusion of the channel platform allows for direct communication via launching access to a channel associated with the trending topic.

Figure 18:
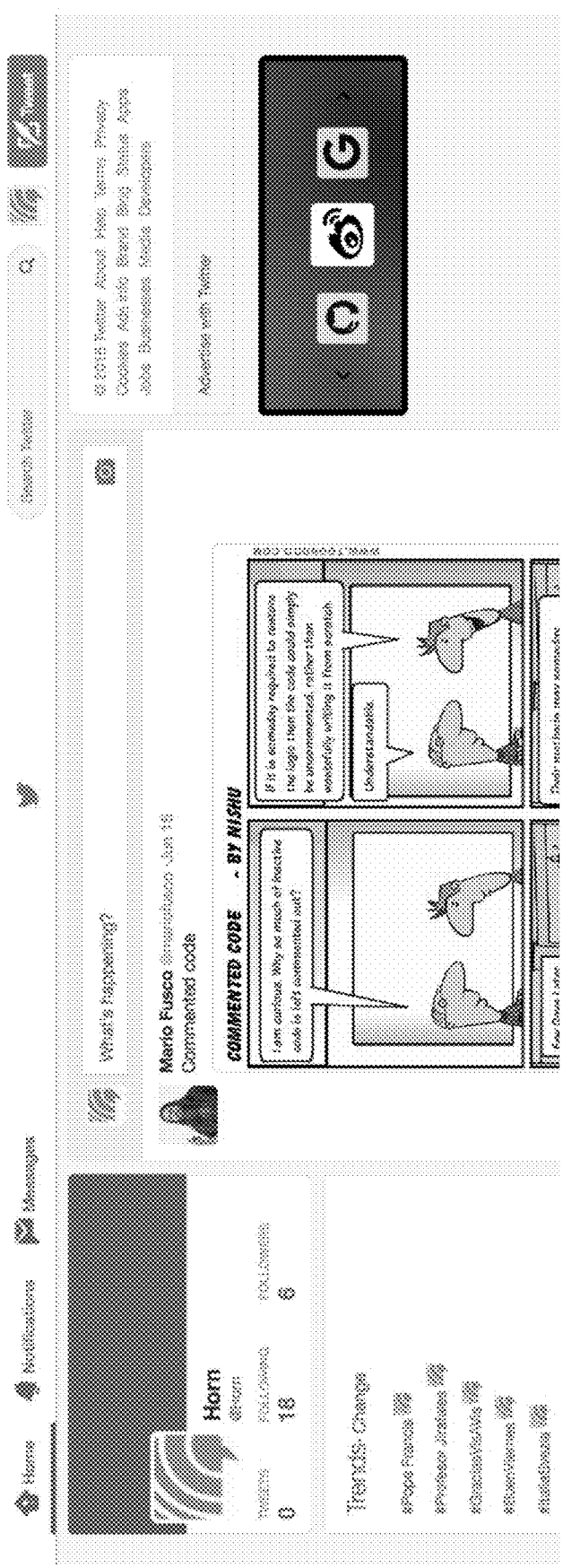
FIG. 18 illustrates a sample screenshot of a communication platform integrated into a media platform.

Therefore, the user can then select one of the icons next to the trending topic. When selected, a new window emerges within the display, as visible in FIG. 18. FIG. 18 shows a screenshot having the communication platform visible on the user interface.

The user may similarly terminate access to the conversation when finished, all within the same user interface of the media platform.

For example, if the common topic is a particular sporting event. Users are posting tweets about that specific event, for example if a favored team scored. Where the prior art interface simply shows "followed" tweets and trending tweets, the inclusion of the channel generator makes the platform immediately fully interactive.

By clicking on a button, the user may then seamlessly enter the bidirectional communication channel relating to the hashtag or other common identifier.

Figure 4:
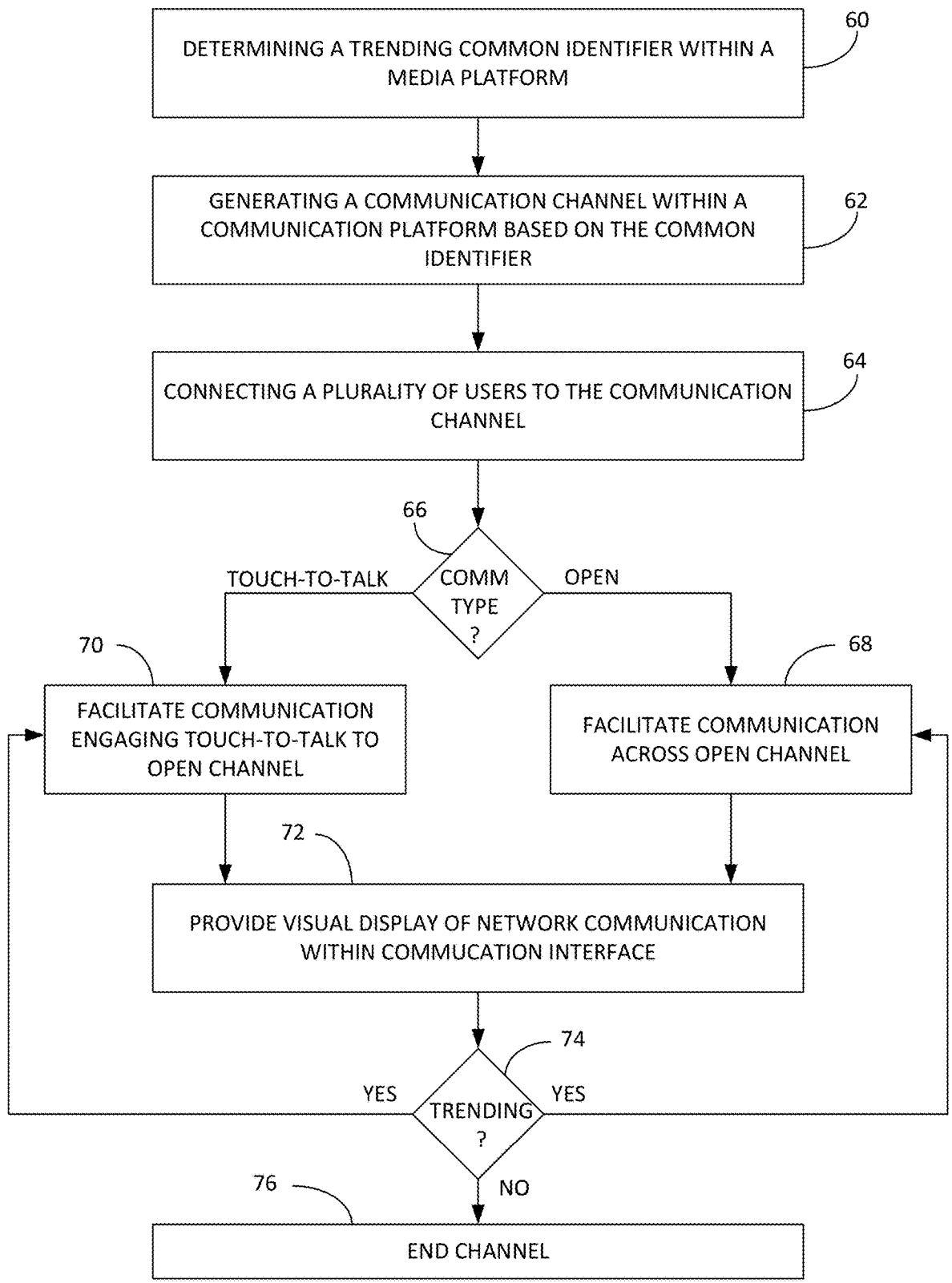
FIG. 4 illustrates a flow diagram of a method for multi-party communication.

The operations of the embodiment of FIGS. 1-3 are further described relative to the flowchart of FIG. 4. FIG. 4 illustrates a flowchart of the steps of one embodiment of method for multi-party communication relating to trending topics. A first step, step 60, is determining a trending common identified within a media platform. As noted above, trending may be defined by the number of uses of a particular common identifier within a defined period of time. Trending may also be determined by other means, including based on the media platform designating the common identifier as being of significant value, e.g. an advertising campaign or other type of media campaign.

Step 62, the method includes generating a communication channel within a communication platform based on the common identifier. As described herein, the platform generates a channel designated for discussion relating to the trending common identifier, and makes the channel accessible to media platform users.

Step 64, the method includes connecting a plurality of users to the communication channel. In one embodiment, users may actively request joining the channel, such as via the user interface. The connection of users may be through the media platform and/or through the communication platform.

Once connected, a determination is made at step 66 based on the type of communication made available. The platform may be an open communication channel or a muted bidirectional channel. If the channel is an open channel, step 68 is to openly facilitate communication across the open channel. If the channel is touch-to-talk, step 70 is to facilitate communication using the touch-to-talk functionality as described herein.

During communication, step 72 provides for visual display of network communication within the communication interface. For example, one embodiment may include a visual display of users within the channel and a display showing when users are speaking into the channel.

Not illustrates in FIG. 4, further refinements and variations of the communication platform are within the scope herein. For example, the channel may include squelch features as described below. In another example, the channel may include secondary channel generation and/or selective muting of various users. In another example, one or more users may be designated to manage or control the channel, having the ability to control other users including changing the user and/or channel from open communication to touch-to-talk or vice versa.

In the embodiment of FIG. 4, step 74 is determining if the topic identified by the common identifier is still trending. If yes, the method reverts back to steps 68 or 70. Once the topic is no longer trending, the channel may be then be terminated, step 76.

As noted above, the present method and system integrates a communication platform with a media platform, whereby generated content is designated with one or more content identifiers. Therefore, media platform users are offered a communication platform for the voice exchange on a topic designated by a common identifier.

As used herein, a communication session provides for multiple users to communicate across a single channel. Prior techniques failed to provide cogent multi-party communication because the inability to mute non-speaking parties created a wall of noise. Multiple parties speaking at once creates an environment where no one can hear other parties, therefore the communication provides muting a user's line unless that user actively engages the network for communication. As described herein, additional visual indicators provide for user display of the multiple party communication, including indicators of which party is actively engaging the channel and thus allowing other parties to remain muted until the channel is open for communication.

In one embodiment, the communication provides a similar or emulated communication technique as found in citizen band (CB) radio communication, wherein a user activates the outgoing communication to engage communication onto the network, but otherwise remains muted in a listening embodiment. Whereas, the present method and system improves and updates such CB-type communication harnessing the functionality available via network communication and software execution found on mobile computing systems.

While the above example relates to hashtags, it is recognized the channel platform is usable for any computer platform that indicates trending or popular topics. For example, the channel platform can be integrated into a stock watching platform. Where a user is conducting research on a particular stock or other trading instrument, the channel platform can create and grant access to a bidirectional communication channel relating to the stock. For example, when a stock is being actively traded, a channel may be engaged for investors to discuss the stock movement. Or in another example, if the corporation is reporting earnings, the earnings report may be listened to across the channel, with the channel then allowing for investor questions.

Another example may be trending search topics in a search engine. Where the common search engine gives a list of static search results and can include a display of trending topics, the inclusion of the channel platform allows for users to actively discuss the trending topics.

Another example of a media platform is a news aggregator or any other form of content aggregator. Where the media platform receives multiple sources of news content and aggregates the content for distribution to users based on user preferences, the news aggregator can therein determine trending or active topics of news or interest. With the inclusion of the channel platform or communication with the channel platform, the news aggregator can then allow its users to actively and seamlessly join bidirectional communications with other users. As with other types of media platforms, the channel is established based on the common interests of users, the channel and discussion topics are timely as indicated by the media platform.

Therefore, the present method and system operates in conjunction with existing interactive platforms. Where the existing platforms are static interactivity of text in and text and/or images out, the inclusion of the channel platform adds a further dimension of user interactivity allowing for actual direct real-time communication among parties. The trending nature of the topic and then generation of a channel relating to the trending topic thus allows for timely channel creation and engaging users in a topic they are already engaged in. When the topic is no longer active or trending, the channel may then be terminated, allowing for the creation of new channels on newly-trending topics.

Figure 5:
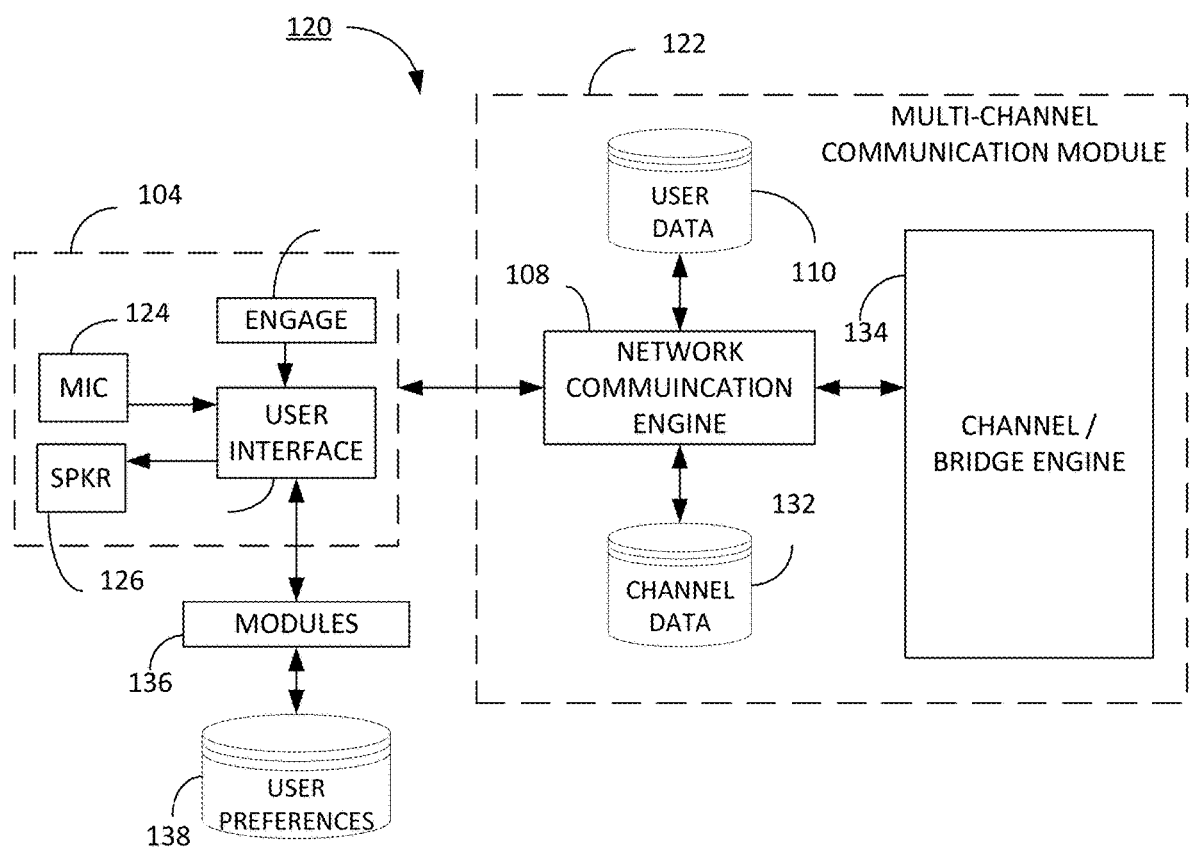
FIG. 5 illustrates one embodiment of a computing system providing for multi-party communication.

FIG. 5 illustrates a system 120 including the user device 104 and a multi-channel communication module 122. The user device 104 includes a microphone 124 and speaker 126, an engage input command 128 and a user interface 130. The multi-channel communication module 122 includes the user data database 122, the network communication engine 108, channel data database 132 and a channel/bridge engine 134.

Further within the system 120 are user connection modules 136 and user preferences 138. As illustrated herein, the modules 136 and preferences 138 are not expressly illustrated within the device 104 or the mobile 122, but it is recognized that these elements may be disposed at either location, or in a completely separate location. As described below, the modules 136 and preferences 138 provide for user communication connection and various engagement activities, therefore, these elements may be network based or may be locally housed on the computing device. Moreover, the system 120 omits the communication interface and networking elements as illustrated in FIG. 5, whereas it is recognized by one skilled in the art that the module 122 and the device 104 communicate across a wired or wireless connection using known communication techniques.

In the user device 104, the microphone 124 and speaker 126 may be standard devices embedded within the device, or in another embodiment may be disposed in external systems connected to the device 104. In one example, if the user device 104 is a smart phone connected to a vehicle in-car wireless (e.g. Bluetooth®) system, the speaker 126 and microphone 124 may be embedded within the vehicle instead of the device 104. Similarly, the user 104 may incorporate a headset or other speaking device, including for example a handheld speaker typically associated with a CB radio electronically connected to the mobile device with a push-to-talk button.

The engage device 128 may be a touchscreen interface found on the mobile device or can be another interface element incorporated within existing systems. By way of example, in a vehicle with in-car telephone functionality, the engage interface 128 may be a push-to-talk button found on a steering wheel or a tactile in-dash interface. In another embodiment, the push-to-talk may be a voice activated system allowing the user 102 to indicate the intention of such engagement on the network.

The user interface 130 may be a stand-alone application running on the device 104 or may in another embodiment be an application available through a browser or other networked interface, including primary execution on a network or cloud-based operation. For example, the interface may be executable in local programming code suitable for the operating device, or may in another embodiment be network based such as an applet, HTML 5.0 or other suitable instruction set for performing operations described herein.

The user interface 130, as described in further detail, including various exemplary screen shots below, allows a user to access one or more communication channels and manage communication across that channel.

In the multi-channel communication module 122, the network communication engine 108 provides functionality for interacting with the user device 104, including presenting interface functionality as necessary. The engine 108 further manages various aspects of multi-channel communication, including detection of available users, available channels, user preference for channels, in-channel communication, muted and active channel engagement from multiple parties, channel moderation, among other operations described herein and as recognized by one skilled in the art.

The communication across the engine is described herein relative to audio input, whereas such communication type is not expressly limiting in nature. Rather, having available bandwidth for the communication, input and/or output feeds may further include video. For example, as well as activating a microphone on a mobile device, the user may active the camera and provide a video feed concurrent with the audio feed. Thus, the present interactivity to audio feeds are additionally applicable to video feeds.

Operational details usable by the engine 108 include user data stored in the database 110, including for example the user login information, location information, reputation information, social networking or contact information, etc. The channel data stored in the channel database 132 includes information on available channels for multi-party communication. As described further below, this can include not only existing channels, but user-generated channels based on any suitable factor or factors, including for example topics of interest, geography, general communication, etc.

The channel/bridge engine 134 operates to connect the user to the proper channel. In one embodiment, the engine 134 provides any number of gates, embedded in hardware and/or software, for connecting the user with the intended channel. The user can be placed on a selected channel and then the engine 108 operates to manage the communication across that channel. The channel/bridge engine 134 receives the user request to join a channel and therein engages into the channel so that the user may therein perform the communication thereon.

The modules 136 are various aspects of the multi-channel communication, including user functionality for controlling the communication. As described further below, these modules may include active display of preferred channels, hiding or muting of users below defined reputational scores, establishing of a location identifier for the user, regardless of the actual location of the user, among other features. Additionally, the user preference database 138 stored user preference data usable for the modules 136 and improving the user interface experience. Such preference data can indicate contact information, preferred communication members, preferred channels, preferred locations, etc.

Figure 6:
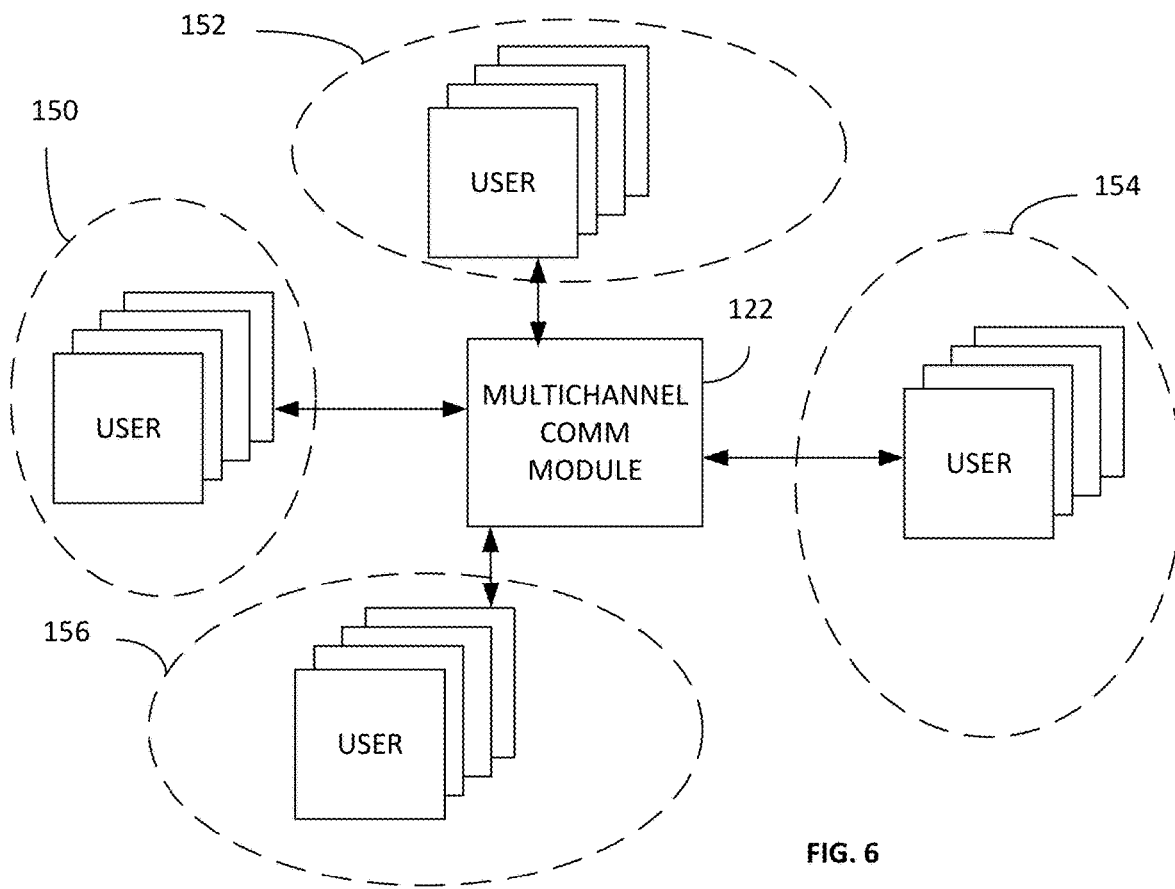
FIG. 6 illustrates a communication display illustrating the multi-party communication interactivity.

As described herein, FIG. 5 provides for an individual user accessing and engaging the communication engine 108 and thus joining or otherwise modifying communication on a channel. FIG. 6 illustrates a broader perspective of multiple users communicating with each other in communication in various groups, illustrated herein as groups 150, 152, 154 and 156. The users in the groups may be disposed at any particular location and thus interact across a networked location, not limited by geographical transmission restrictions previously found in CB radio techniques.

As noted above, the grouping may be based on any suitable grouping technique. For example, group 150 may be users in the western region of the United States, group 152 are users in the northern Midwest region, group 154 are located in the east coast and group 156 are users located in the southern region of the United States. In another example, users 150 may be Republicans, group 152 are Green party members, group 154 are Democrats and group 156 are Independents.

Therein, via the multichannel communication module 122, the users within their respective groups are able to engage communication. Moreover, users are able to switch groups based on active engagement of the user interface 130 and functional operations of the network communication engine 108 of FIG. 5.

Figure 7:
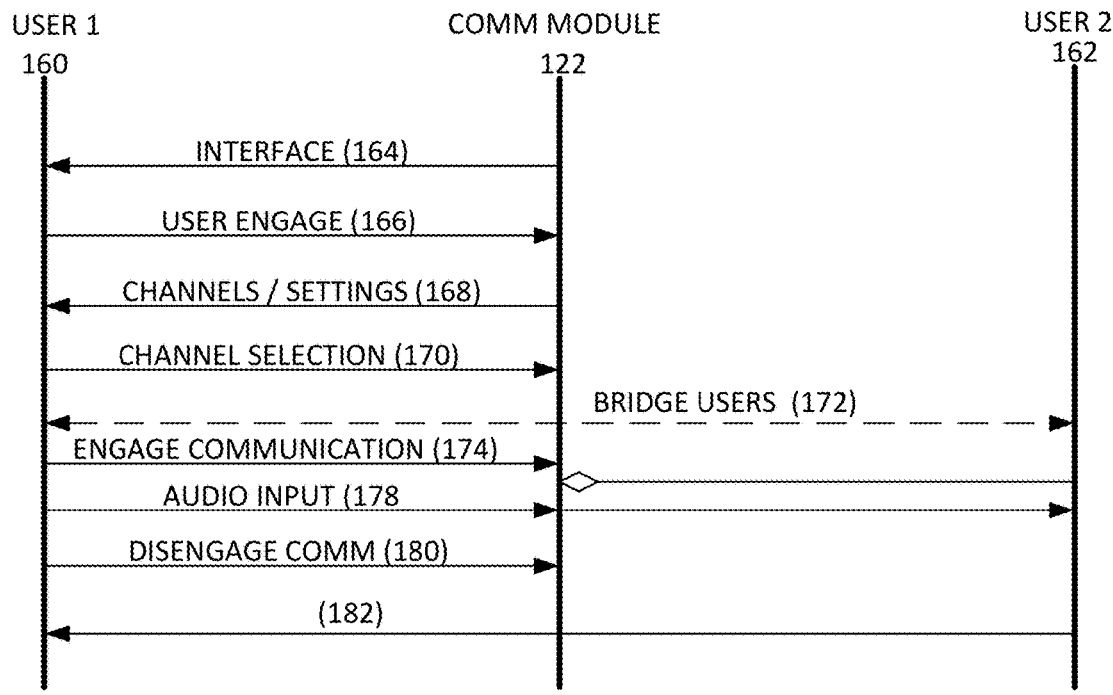
FIG. 7 illustrates a data flow diagram for one or more embodiments of multi-party communication.

FIG. 7 illustrates a data flow diagram representing one embodiment of the multi-channel communication described herein. In this data flow diagram, communication and data exchange occurs between a first user 160, the communication module 122 and a second user 162. In one embodiment, the module 122 provides interface information, step 164, to the first user 160. As noted above, the interface information may be provided via a browser or other type of communication interface, whereas in another embodiment the interface functionality may already be disposed on the user computing device.

The user 160 therein engages, step 166, the communication module 122. This engagement includes the user submission of login or other identifier information. In one embodiment, the user has an existing account with the module 122, but it is recognizes that absent an existing account, the user 160 may be instructed to generate an account providing account information, including user information, a handle or communication name, and other information as necessary to verify the user, including age.

The module 122 therein, in this embodiment, submits channel/settings information, step 168, to the user 160. In one embodiment, the channel listing may be locally stored by the user, but the information 168 may include updating information to indicate which channels are active, list of users of various channels, etc. By contrast, another embodiment allows for the transmission of this channel-specific information to the user 160, so that via the user interface, the user can view the available channels.

Figure 8:
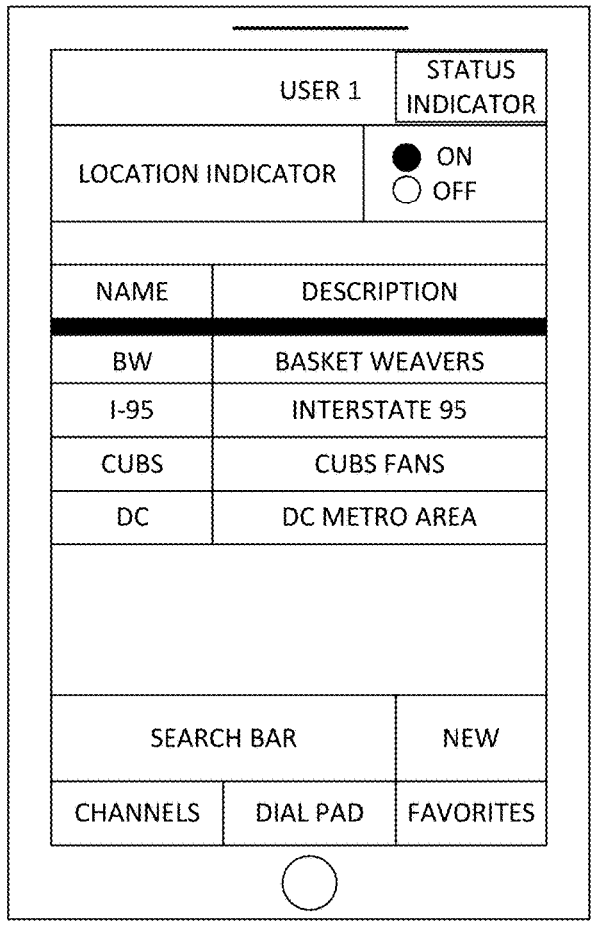
FIGS. 8-14 illustrate representative screenshots as visible on a mobile computing device for user interaction with the communication system.

FIG. 8 illustrates a sample screenshot of a user interface as visible on a mobile computing device. In this example, the interface includes a display of the user's name, a status indicator if the user is active on a channel, a location indicator and a toggle field to indicate if the location identifier is on (e.g. the mobile device is transmitting or otherwise using location information). The interface further includes a display of available channels, herein the example of a name and a description. This example includes 4 possible channels, based on the user preferences. A first channel is for users interested in the art of basket weaving. A second channel relates to the geography of traveling on Interstate 95, the third channel is for fans of the Chicago Cubs and a fourth channel is for users location or interested in the Washington, DC metro area.

The interface further includes touch interface functionality of a search bar, a new button for generating a new channel, a channel viewer bar, a dial pad and a favorites indication toggle button.

With reference back to FIG. 5, the user therein selects a channel via the user interface and sends the channel selection, step 170, to the module 122. The module 122 therein bridges the user 160 with the second user 162 via the channel. Wherein, in one embodiment, the second user 162 may be actively engaged with any number of other users on the channel, the first user 160 is then granted permission for communication on the channel.

Figure 9:
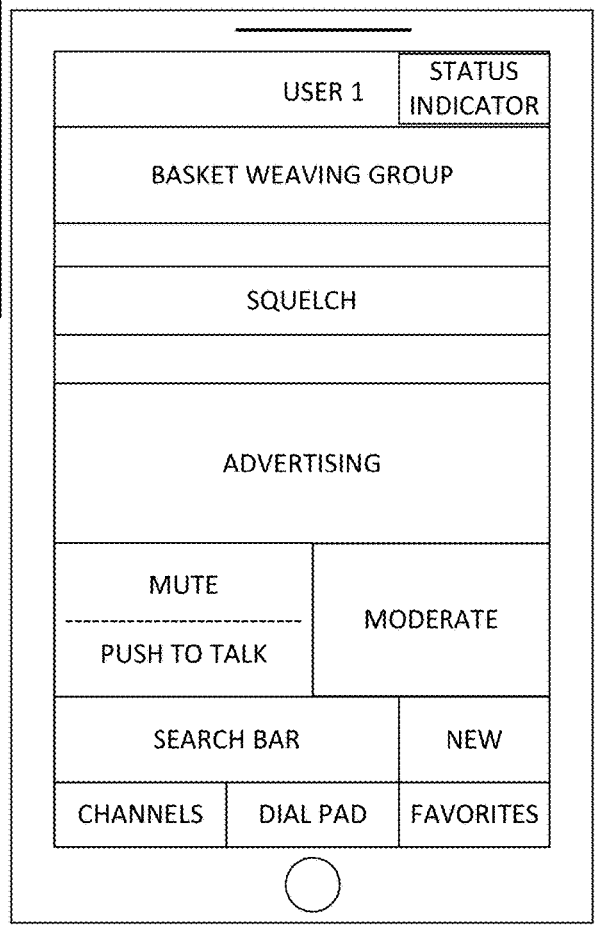

FIG. 9 illustrates a sample screenshot of a user interface wherein the user has selected the basket weaving group. The interface includes a squelch button for limiting or otherwise modifying the interactivity. The interface further includes, in one embodiment, advertising. The interface includes an engagement button, here indicating a mute and push to talk display. When the user is not engaged, the device is muted to allow the bi-directional communication. One embodiment includes inclusion of a moderate button allowing a person to either moderate a channel, e.g. exclude certain users, or report users or behavior to a moderator.

Figure 10:
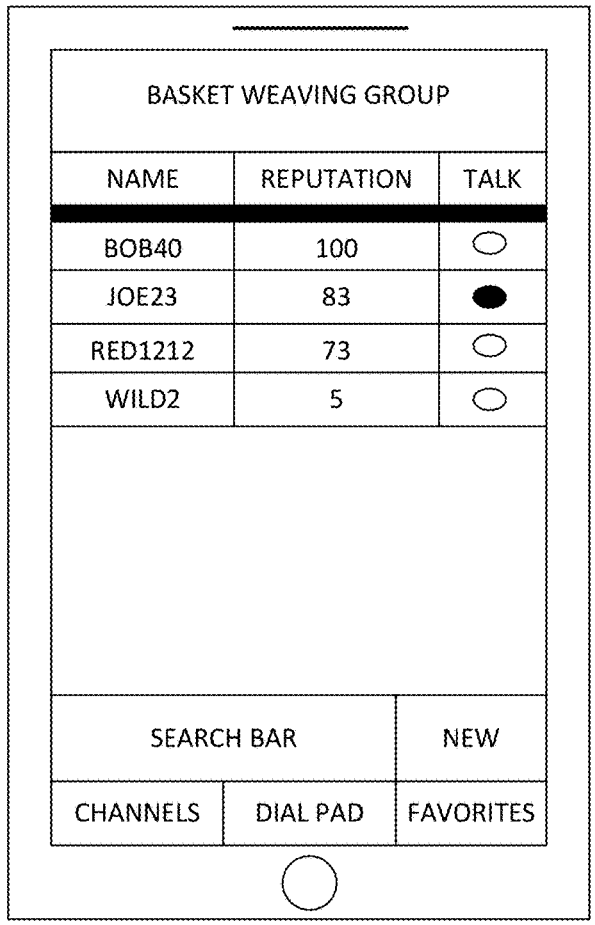

FIG. 10 illustrates another aspect of the system, the inclusion of reputation or user preferences. In the user interface, the user can view the active members in the channel, as well as a reputation score. The reputation score may be specific to the user or can be specific to a channel. In the exemplary display, there are four other users in the channel each having different reputation scores. Also visible is a toggle indicator indicating which user is engaging the network to speak.

Figure 11:
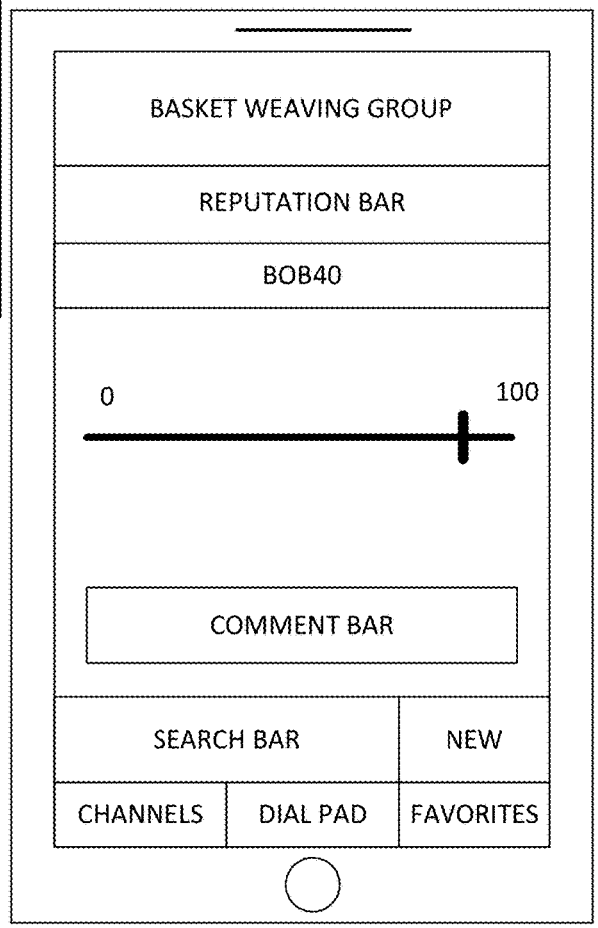

FIG. 11 illustrates another aspect of the reputation, including the user setting of a reputation or the user contribution to a reputation score. In this exemplary interface, the reputation indicator includes a sliding bar between a low value, in this example 0, and a high value 100, such that the user can toggle or slide the bar between the values to set a reputation score. The user may also add comments as applicable.

With reference back to FIG. 7, the user 160 may therein seek to engage on the communication channel. The user submits an engage signal, step 174, e.g. activating the push to talk button that then opens the channel for other users to then hear the user 160 audio. As illustrated in data flow diagram, one embodiment includes the modulation or regulation of other users while a user engages the channel. Therefore, the communication 176 by the second user 162 does not pass through the communication module 122 to the first user 160 while the first user has engaged the channel. This regulation allows for the prevention of the excess noise or multi-party concurrent talking on the channel. In another embodiment, this allows for the muting of the first user 160 so that there prevents audio interference or feedback when the first user speaks.

Thus, step 178 allows for the first user 160 to share audio across the channel, such audio is then distributed to the second user 162 and all other users on the channel. The user 160 therein disengages communication, step 180, to open the channel back up for the other users on the channel. Therein, the first user 160 is operative to receive further communications from the second user 162, step 182, when the channel is open.

The data flow operations continue in similar operating techniques for multiple channel users, until users disconnect from the channel or disconnect from the module 122.

The user may additionally squelch or otherwise modify the interaction experience. As noted above, a user may filter other users on the channel based on reputational scoring, e.g. blocking his or her mobile device 104 from receiving audio from users having a score below a threshold reputational score. In another embodiment, the user may selectively filter users with whom the person may engage on the channel.

Figure 12:
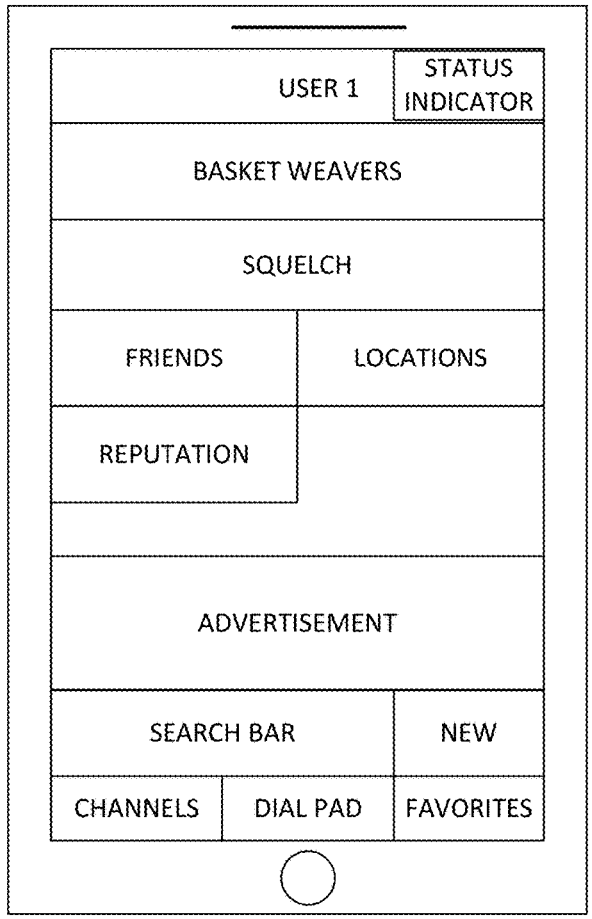
Figure 13:
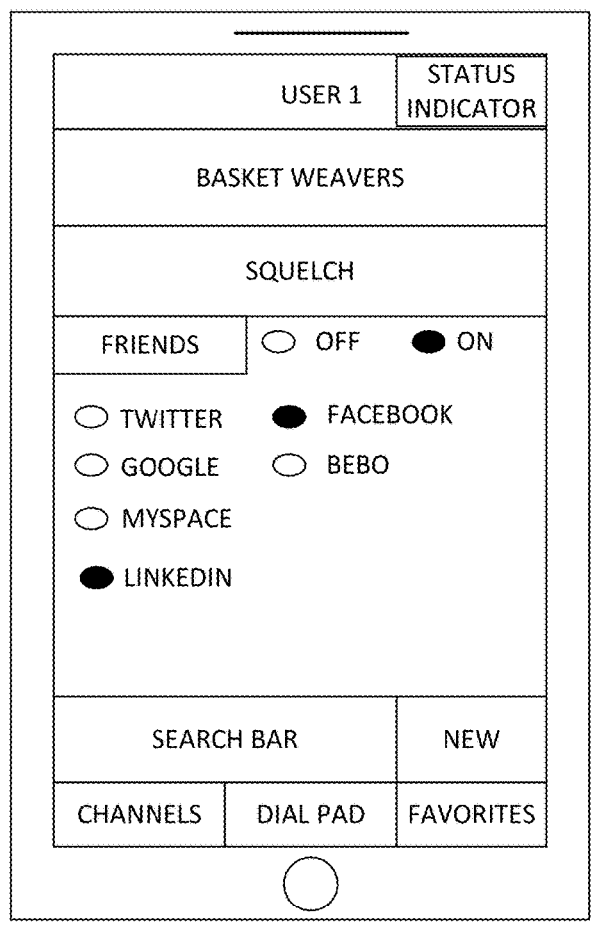

FIG. 12 illustrates a sample screen shot of the user interface including filtering options. In this embodiment, the filter can be based on friends, a location or a reputation score. FIG. 13 illustrates a sample secondary screen upon the selection of the friends filter, including filtering features and various social media or other contact lists.

Figure 14:
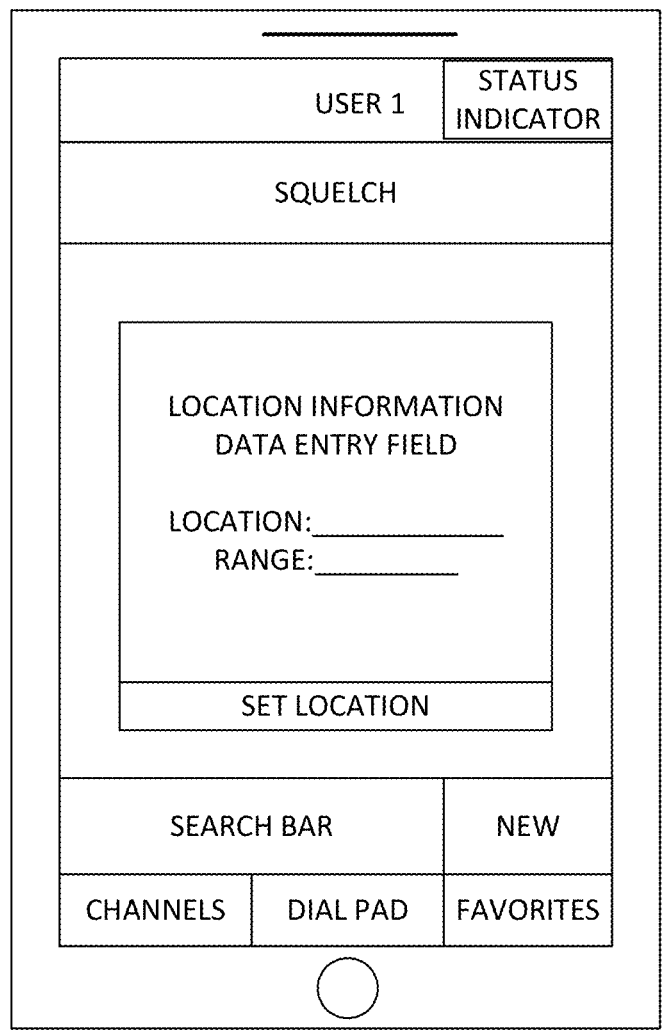

FIG. 14 illustrates a screenshot of one embodiment based on location information. The present method and system can use the actual location of the user and/or user device, or in another embodiment the user can select a particular location. For example, if a person is originally from a foreign country and misses general conversation with people from his home country, the user may select the geographic location as being in the home country, even though the individual may be located anywhere in the world.

Similar to geography, the user may set a zone from which to chose possible users, so that the geographic discussion is more centrally located. One example may be a user selected a zone of Interstate 95, to speak with fellow users on Interstate 95. The user may wish to limit the zone to a 25 mile radius to better engage local users. Whereas a user in Jacksonville, Fla. may not be interested in possible construction or road delays in Delaware along Interstate 95, but rather is concerned with tourist traffic between Jacksonville and Daytona Beach. Thus, the user can set the geographic zone as appropriate.

Further embodiments herein are provided as follows:

Channel Connections can include Interstate communication. The Classic CB Radio, with a twist. CB radios let drivers keep in touch with each other for helpful traffic information but it also allowed for some very fun, albeit sometimes a bit edgy, discourse between random strangers, from the comfort of their own cars. The present method and system facilities everything the old school CB did, but without the need for specialized equipment or bulky antennas.

Channel connections can include Facebook groups/Twitter Lists/Google+ Circles. By connecting to various Social Networking systems you can either join or create a channel that is only open to members of your Group/List/Circle. As long as the other user is also connected to the same Social Network subset you'll be able to talk. Think of this like a standing open conference facility just for your group.

Channel connections can include Subject/Interest. A variety of pre-existing channels exist for a variety of subjects or interests. Users can also submit requests for new, permanent, interest focused channels.

Channel connections can include Personal channels. You can establish a new channel any time! Just give it a name and a few details and your own new channel is up and running!

The system supports a virtually unlimited number of users in a channel however this would make for a noisy channel so several 'filters' are introduced to allow for a 'squelching' of the conversation. This squelching feature can operate on several factors.

Squelch (Filters) can include Distance. Using location awareness from mobile devices or the "geolocation" of your computer, or by a real or "virtual" location (why not virtually be wherever you like!), and then you can turn the squelch up or down and limit the conversation to only other users within your desired range.

Another squelch (filter) includes Facebook Friends/Twitter Follows/Circles. One great way to cut out the chatter is to limit who you are talking with to just your 'friends'. Even if you are in a busy channel you can flip the social switch, and only hear and be heard by people in your linked social networks.

Another squelch (filter) includes Individual (+/−). Some users can be annoying. Or, you might want to listen, but not to them right now. Click them out of your conversation. You can mute any individual in a channel either temporarily or permanently. They will just not exist to you any more. Gone!

Another squelch (filter) includes Reputation Score. Those users we just got rid of are likely annoying to everyone else as well. Put a vote in on their reputation! With the reputation filter you can set a minimum reputation level for users you will have to hear. Oh yeah, and vote the good folks up, too!

A further embodiment of the platform provides for whisper mode operation. In this embodiment, a user may request another user engage in a second or side conversation outside of the context of an existing conversation or forum, without disruption of the existing conversation or forum.

By way of example, if the user is communicating using the sample interface of FIG. 10 in the "basket weaving group," a second user requests for the user to join a secondary conversation originated via the platform 112. Using the example of FIG. 7, if BOB40 wishes to mention something to RED1212 outside of the existing group, the BOB40 can then make a whisper mode request to RED1212. Using this whisper mode request, enabled using executable software running on the user interface, as well as via the platform itself, RED1212 is then notified that BOB40 requests whisper mode communication. In one embodiment, the whisper mode communication may be a text messaging window that pops up, leaving the original group audio active. In another embodiment, the whisper mode communication may be an audio or video interface that mutes or otherwise dampens the volume of the existing group remaining concurrent in the background.

When the users in the whisper mode conclude the communication, they may then disconnect from that side channel and rejoin the group. Or, in another embodiment, users in whisper mode may toggle between whisper mode for side conversations and the group, such as maintaining on-going discussions with group member(s) outside of the group conversation itself.

The method and system includes Talk Modes. One talk mode is a Push to talk (PTT). Just like the old school CB. Hold a button down (which one will depend on the device you have), and then talk. Otherwise you are in listen only mode.

In a further embodiment of the push to talk mode, the mode may be also referred to as touch-to-talk (T3). In a mobile or computing interface environment, the user may not be required to physically push a button or other toggle control, but rather may be touch a user interface element, therefore providing a touch to talk interface. As used herein, the terms push to talk and touch to talk are interchangeable, as providing a means for converting an open communication into a channel having input restrictions.

In prior push to talk embodiments, such as found in citizen band radios or mobile phone communication systems, the load on the communication channel was a primary limitation. In the present method and system, existing network technology does not suffer from these limitations, but the communication platform can still benefit from communication having a T3 enablement.

Figure 15:
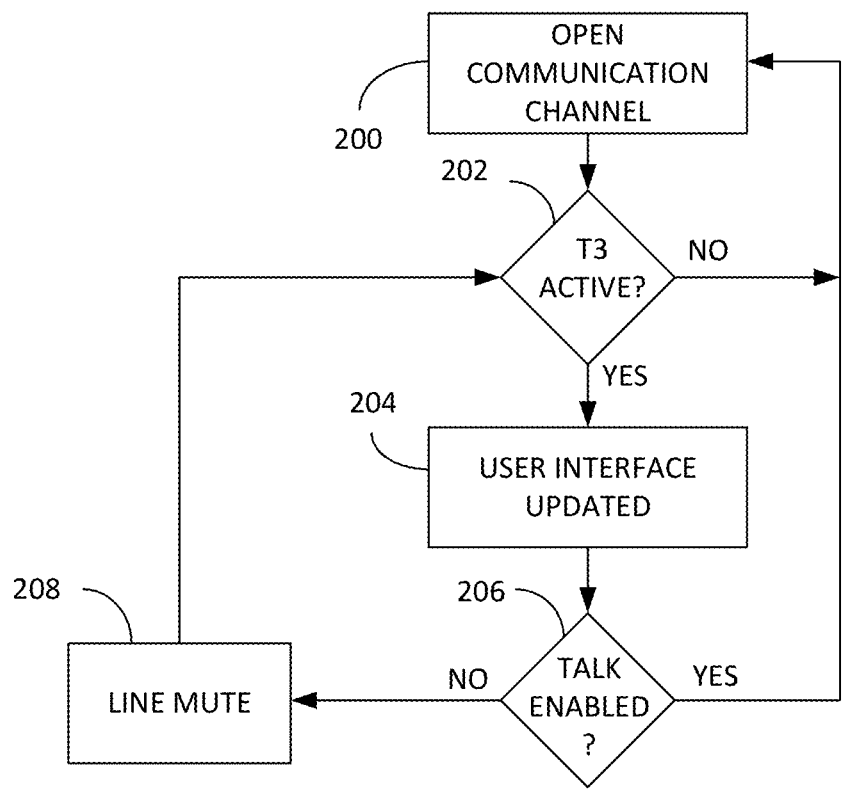
FIG. 15 illustrates a data flow diagram of a touch to talk embodiment.

FIG. 15 illustrates one embodiment of an operational flow diagram of a method for T3 operations within the herein described communication platform. Within the operations of the platform, for example operations of the system of FIG. 2, T3 operations may be included therewith. In a user interface, a T3 toggle button may be displayed, switching the user from an open channel communication to the T3 communication. In one embodiment, the T3 toggle button may be selected by the user, but in another embodiment may be engaged by a supervisor or system mod.

For example, if the platform is hosting a conference call with multiple users and a single user has a high recurrence of an interference background noise, e.g. a dog barking in the background, the user hosting or controlling the communication platform may unilaterally toggle the particular user into a T3 mode. This would then convert the user into a muted bidirectional communication technique, in essence muting the user's line until the user wishes to talk. In the user interface, the user themselves may be notified of being switched in T3 mode by a display of a muted signal, or the presence of an interface button allowing for touching the button to thus talk.

In one operational embodiment, FIG. 15 illustrates a flowchart of the steps of toggling T3. A first step, step 200, is the platform operating in an open channel format. The open channel format, also referred to as open mode, allows for all parties to have full on going open communication on the platform. The open communication (open mode) may be tempered in any number of ways based on the utilization of the platform, e.g. if a moderator controls the channel, with for example three designated speakers and any number of designated listeners, the designated listeners may be in listen-only mode with the moderator and speakers having full open communication.

In the operation of the platform, communication is conducted between users, whereby step 202 is a determination step if the T3 feature is enabled for one or more users. If not enabled, the method reverts back to step 200 with the open channel operating in open mode for allowing open and free communication between all parties. If T3 is enabled, step 204 is updating the user interface to include a touch to talk button or interface functionality. Thereby, the user being placed in T3 operations must touch the talk button to open the channel, as such step 206 is a determination if the talk button or talk interface is enabled.

If the inquiry to step 206 is no, the button is not enabled, step 208 provides that the user's line remains in a mute position. If the button is enabled, thus opening the communication channel to the user, the method reverts to step 200 providing the open communication channel operating in the open mode for the duration of the enabling of the talk function.

Another talk mode is normal, just like a telephone call today. There is also speakerphone, just like a speakerphone call today hands free but in the cloud. These modes do not require a touch to talk (T3) element and therefore operate within the open mode as described above.

A user may use a headset, just like a headset call today—including support for Bluetooth and Wired headsets on phones and computers.

Because sometimes you would rather not be heard, there is a mute functionality. Similar to the PTT mode but when mute is off you are back in whatever your previous mode was.

Broadcast Mode (Stream out with no input). Say you really want to be heard, and want your own soapbox. Broadcast mode is for you. Suddenly anyone can have their own 'radio station'. What you do with it is up to you and those two little dudes on your shoulders.

In one embodiment, in exchange for having a great reputation the user can gain moderator privileges in the public channels. Moderators are given ModPoints that they can use to remove people from a channel for a period of time or if they feel really strongly that the person is a liability to the community they can use a few more ModPoints to report them for review. ModPoints come from a variety of sources but primarily from having a great reputation!

A user may also generate and control the user's own channel. When you are in a channel that you created you can manage who can listen or speak. Manage content. Control everything via the user interface.

In one embodiment of creating your own channel, or usurping a channel for your own purposes, the user may selectively mute all other parties in the channel. For example, if the channel is hosting a discussion with multiple parties speaking at once, a moderator can enable a rude solo functionality thereby muting everyone but the moderator. This single user interface selection actively mutes one or more or all parties, making the moderator the only one able to be heard across the communication platform.

A further embodiment of the user platform allows for control operations dynamically generating a recordable broadcast. The platform provides for multi-party communication including audio as well as video content. With executable instructions for controlling the user interactions into a broadcast, a user may dynamically generate a recorded stream made available for later distribution.

The platform utilizes the existing incoming communication data streams with production mixing functionality. Illustrating the present embodiment by virtue of an exemplary embodiment, one embodiment may be the dynamic generation of a podcast or similar content stream. For example, the platform may include multiple users in communication with each other, discussing a specific topic with a single moderator. The moderator may include control functions for designating recording of selected users at different times, generating a combined broadcast.

Figure 16:
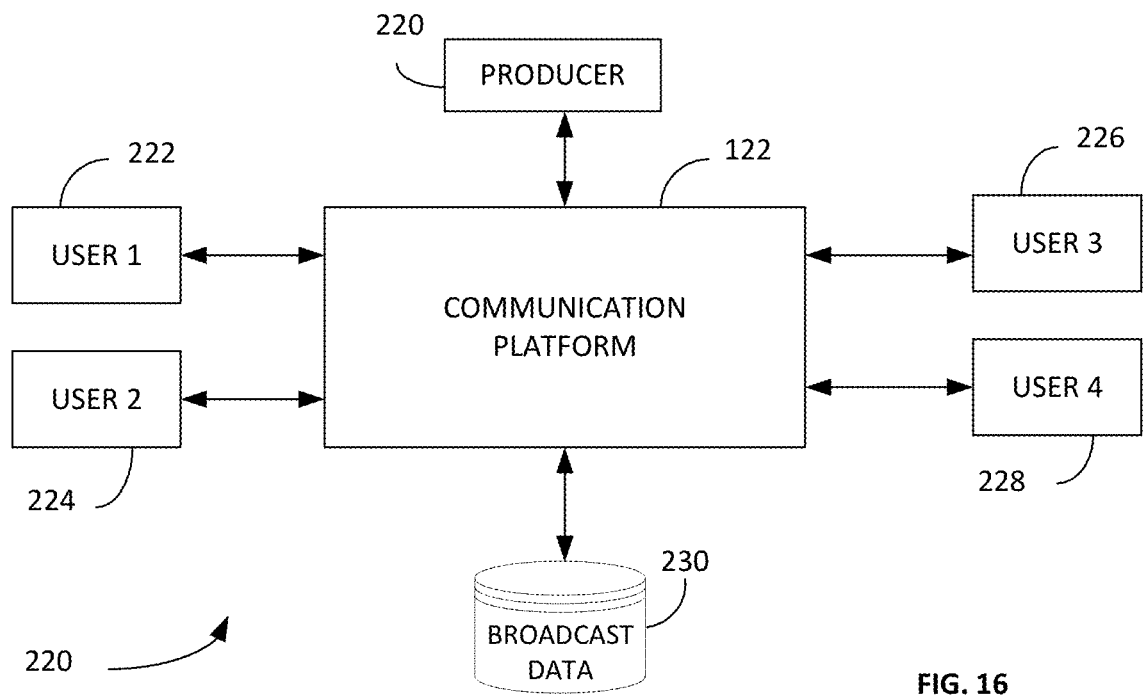
FIG. 16 illustrates processing components of dynamic mixing or production functionality within the communication platform.

FIG. 16 illustrates a sample processing system 220 for dynamic generation of recorded content. This system includes the multi-channel communication module 122 with users 222, 224, 226 and 228, similar to user 160 as described above with respect to FIG. 4, or users 150, 152, 154 and 156 described above with respect to FIG. 3. The platform 122 further includes communication with a database 230 operative to store recorded content therein.

The system 220 further includes a producer 232 controlling the production operations via a production interface. The production interface may be a computer-generated interface allowing for producer or mixing functionality, such as selecting one or more users for recordation. It is also noted that the producer 232 may be one of the users 222-228, but is illustrated separately for clarity purposes-only.

In the above example of a generating a podcast, the first user 222 may run the podcast having 3 guests, users 224, 226 and 228. A separate producer 232 therein runs the production interface, freeing up the user 222 to moderate the podcast. The podcast may be a pure audio podcast, but may also include video, such as video of the users 222-2228 as then interact via the platform 122. Additionally, users may provide ancillary video from other feeds, for example if user provides a pre-made video to accompany the discussion, or the moderator inserts a commercial.

In the embodiment, the users 222-228 engage in multi-party communication using the system as described herein, including connecting via the network communication engine. When the users are engaged with the engine, a visual interface displays the available communication channels, such that users select the designated channel. Using the above example of a podcast, the podcast host may create a channel and designate the podcast will begin recording at a set time. Thus, the podcast host and any guests join via the communication engine. Listeners may also join the channel, and can be designated as listen-mode only.

The producer 232 may therein produce a recorded podcast by controlling which of the various user feeds 222-228 are given broadcast priority, or maybe creating split-screens showing two active speakers and not bothering to display non-active speakers.

It is noted that while the producer can generate produced content, the platform 122 allows for any number of active listeners to listen to the full interaction, live, between the users 222-228. For example, any number of additional users (not shown) may be designated in listening mode only, full muted, and able to listen and/or view the communications on the platform. In another embodiment, the moderator (here user 222) may close the platform to the public and limit access solely to the produced content from the producer 232.

In another embodiment, the platform 122 may actively record the full streams of all active users, here users 222-228. Then, at a later point in time, the producer 232, which may also be one of the users 222-228, can then generate the recorded content using the techniques described above.

Therefore, the platform 122 using producer interface functionality available via executable instructions, allows for the generation of audio and/or video content into a defined broadcast. The recording of the broadcast therein allows for concurrent or later distribution using one or more known broadcast distribution techniques.

The utilization of the network for content generation further provides for the producer or other users to utilize additional network functionality. By way of example, the producer may utilize a T3 mode for certain listeners and leave the host in an open mode, with having the ability to switch communication modes. Another available feature is the side communication request, allowing for side communication between users without interrupting or disrupting the channel itself.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for multi-party communication comprising:
   determining an identifier identifying a trending topic on a social networking system, wherein the trending topic is a topic of a plurality of social media posts posted on the social networking system within a defined time period;
   generating a communication channel within a communication platform based on the identifier, the communication channel identified by the trending topic;
   in response to a join request from each of a plurality of users, connecting the plurality of users to the communication channel identified by the trending topic, where the communication channel is an open communication channel for active audio communication between the plurality of users directed to the trending topic;
   for each of the plurality of users, receiving a user profile associated with the communication platform and identifying the plurality of users within the communication channel identified by the trending topic based on the user profile associated therewith;
   facilitating audio communication between the plurality of users, including providing a visual display on the communication platform, including visual display of the active audio communication across the communication platform; and
   monitoring the social networking system for determining if the identifier continues to identify the trending topic on the social networking system to maintain the communication channel while the identifier identifies the trending topic.

2. The method of claim 1, wherein determining the identifier is based on a user input.

3. The method of claim 1, wherein the communication channel operates using an open communication channel operating in an open mode, the communication channel operative to being switched to a touch-to-talk mode based on:
   receiving a user selection for changing a communication mode from the open mode to the touch-to-talk mode; and
   updating the user communication within the communication channel based thereon including switching the commination channel to operate in the touch-to-talk mode.

4. The method of claim 1 further comprising:
providing a visual display on the communication platform of active engagement of the plurality of users engaging the communication channel to distribute audio communication thereacross, including illuminating a visual display associated with the user when the user is actively talking.

5. The method of claim 4 further comprising:
squelching one more of the plurality of users in a dynamic manner such that the one or more of the plurality of users are restricted from active communication; and
providing a visual display of the squelching, the visual display visible within the communication platform.

6. The method of claim 1, wherein the social networking system is disposed within the communication platform.

7. The method of claim 1, wherein the social networking system is independent from the communication platform.

8. A system for multi-party communication, the system comprising:
a social networking system for facilitating social engagements thereon; and
a communication platform for providing audio communication between a plurality of users thereacross, the communication platform:
determining an identifier identifying a trending topic on a social networking system, wherein the trending topic is a topic of a plurality of social media posts posted on the social networking system within a defined time period;
generating a communication channel within a communication platform based on the identifier, the communication channel identified by the trending topic;
in response to a join request from each of a plurality of users, connecting the plurality of users to the communication channel, wherein the communication channel is an open communication channel for active audio communication between the plurality of users directed to the trending topic;
for each of the plurality of users, receiving a user profile associated with the communication platform and identifying the plurality of users within the communication channel identified by the trending topic based on the user profile associated therewith;
facilitating audio communication between the plurality of users, including providing a visual display on the communication platform, including visual display of the active audio communication across the communication platform; and
monitoring the social networking system for determining if the identifier continues to identify the trending topic on the social networking system to maintain the communication channel while the identifier identifies the trending topic.

9. The system of claim 8, wherein the communication channel operates using an open communication channel operating in an open mode, the communication channel operative to being switched to a touch-to-talk mode based on receiving a user selection for changing a communication mode.

10. The system of claim 8, wherein the communication channel provides a visual display on the communication platform of active engagement of the plurality of users engaging the communication channel to distribute audio communication thereacross, including illuminating a visual display associated with the user when the user is actively talking.

11. The system of claim 8, wherein the social media network is disposed within the communication platform.

12. The system of claim 8, wherein the social media network is independent from the communication platform.

* * * * *